(12) United States Patent
Hirata et al.

(10) Patent No.: US 7,014,319 B2
(45) Date of Patent: Mar. 21, 2006

(54) PROJECTION TYPE COLOR DISPLAY DEVICE

(75) Inventors: Koji Hirata, Yokohama (JP); Masahiko Yatsu, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/808,391

(22) Filed: Mar. 25, 2004

(65) Prior Publication Data

US 2004/0246444 A1    Dec. 9, 2004

(30) Foreign Application Priority Data

Mar. 25, 2003   (JP)   ............................. 2003-081719

(51) Int. Cl.
*G03B 21/14*    (2006.01)
(52) U.S. Cl. ............................................ 353/31; 349/5
(58) Field of Classification Search ................ 353/31, 353/34, 37, 122; 349/5, 7, 8, 61; 348/750, 348/751
See application file for complete search history.

(56) References Cited

U.S. PATENT DOCUMENTS

| | | | | |
|---|---|---|---|---|
| 5,467,154 A | * | 11/1995 | Gale et al. | ................ 353/119 |
| 5,661,654 A | * | 8/1997 | Nagashima | ................ 700/176 |
| 5,894,489 A | | 4/1999 | Halldorsson et al. | |
| 6,398,389 B1 | * | 6/2002 | Bohler et al. | ................ 362/293 |
| 6,483,566 B1 | * | 11/2002 | Youn et al. | .................... 353/29 |
| 6,561,654 B1 | * | 5/2003 | Mukawa et al. | ............... 353/31 |
| 6,568,811 B1 | * | 5/2003 | Noda et al. | .................... 353/31 |
| 6,688,747 B1 | * | 2/2004 | Wichner et al. | ............... 353/29 |
| 6,733,139 B1 | * | 5/2004 | Childers et al. | ............... 353/94 |

FOREIGN PATENT DOCUMENTS

| | | |
|---|---|---|
| JP | 10-164604 | 6/1998 |
| JP | 2001-186539 | 7/2001 |
| JP | 2003-005167 | 1/2003 |

* cited by examiner

*Primary Examiner*—William C. Dowling
(74) *Attorney, Agent, or Firm*—Antonelli, Terry, Stout and Kraus, LLP.

(57) ABSTRACT

A projection type color display device capable of achieving both the color balance and higher luminous flux amount (high luminance) of enlarged on-screen images is disclosed. The device includes a white light source, light flux separating unit, image display elements, photosynthetic unit, and a projection lens device. The light intensities of light fluxes of three primary colors of red, green and blue as split by the light flux separating unit are modulated by the image display elements which are provided in a way corresponding to respective ones and then synthesized together by the photosynthetic unit for enlarged projection onto a screen by the projection lens device. During red image displaying, a red image signal is input to the red image display element while performing modulation by the blue image display element based on a signal obtained by adding to a blue image signal a signal with its amplitude being 1/n times the amplitude of the red image signal.

13 Claims, 7 Drawing Sheets

PROJECTION TYPE COLOR DISPLAY DEVICE

BACKGROUND OF THE INVENTION

The present invention relates to a projection type color display device which separates light of a light source into three color light fluxes at a spectrum optical system for split into color light fluxes of red, green and blue and guides respective color light fluxes thus separated to enter more than one image display element with a matrix layout of pixels having light intensity modulation means and then causes an enlarged projector device to project in an enlarged form the light with its light intensity modulated by the image display element in response to an image signal. More particularly, but not exclusively, this invention relates to a projection type color display device which is excellent in light use efficiency even in cases where a red light flux energy-reduced ultra-high pressure mercury lamp, a xenon lamp, a metal halide lamp or the like is used as the light source. The invention also relates to a rear-projection type color display apparatus which uses the projection type color display device to project a projection image therefrom by way of an optical fold mirror in an enlarged form onto a translucent screen that is provided at a prespecified location of a cabinet.

In recent years, projection type color display devices have been actively developed, which have a polarized light conversion device for converting light from a white light source into the same polarized wave, a light flux spectrum optical system made up of a dichroic mirror for split into respective color rays of red (R), green (G) and blue (B), optical path turn-back or fold mirrors for folding the optical paths of the red, green and blue light fluxes respectively, image display elements provided in a way corresponding to respective color light fluxes and having a matrix array of picture elements or "pixels" with the means for modulating the light intensity of each luminous flux correspondingly to an image signal to thereby form an optical image, a photosynthetic optical system which is formed by adhesion of prisms with provision of an optical filter for superposing optical images thus formed by these image display elements respectively to thereby provide a color image, and a projection optical system for projecting the color image superposed by this synthetic optical system in an enlarged form onto a viewing screen.

In these projection type color display devices, there is used the one with combination of one set of "fly eye" lenses, called an integrator optical system, in its illumination system for the purposes of achieving higher luminance and making on-screen luminance uniform.

Furthermore, the light source is designed to use a metal halide lamp of the short arc type having a light-emitting tube with a metal halogenide sealed therein for utilizing light emission unique to such metal to shorten the distance between electrodes, an ultra-high pressure mercury lamp which is easy to attain higher luminance, a xenon lamp with enhanced vivid coloring performance or "colorability," and other similar suitable lamps. Among them, the ultrahigh pressure mercury lamp is high in luminance and short in arc length while offering the functionality resembling that of a point source so that the light use efficiency is excellent when combining it with the integrator optical system and also excellent in uniformity of on-screen luminance.

One example of the above-noted projection type color display devices is the one using transmissive liquid crystal panels as the image display elements thereof, a configuration of which is disclosed, for example, in JP-A-2003-5167.

SUMMARY OF THE INVENTION

In a projection type color display device using liquid crystal panels shown in FIG. 3, the white light flux emitted from a white light source 201' is split by a fly eye lens 202' into light components, which are projected by a fly eye lens 203' and field lens 204' which are disposed at opposing positions in an enlarged form onto a liquid crystal panel (G) 211', liquid crystal panel (B) 213' and liquid crystal panel (R) 212' while being superposed together. Due to this, the energy distribution of light fluxes falling onto the panels is made uniform or "uniformized." In addition, the white light flux is split by a dichroic mirror 206' that is disposed in the optical path into a red light flux and a cyan light flux. The chromaticity of red image light is determinable by the spectrum reflection characteristics of the dichroic mirror 206' and the spectrum reflection characteristics of a trimming filter provided at a lens 210a'. For the home-use applications, it is a general approach that a specified wave length at which the reflectivity of dichroic mirror 206' relative to the light in a red region becomes 50% or less is set at about 580 nm. Additionally, regarding the spectrum reflection characteristics of the trimming filter provided at the lens 210a', a wavelength whereat the reflectivity relative to the red region light becomes 50% or less is ordinarily set at about 595 nm.

As the reflectivity fall-down property at this time increases in sharpness (reflectivity change/wavelength), the risk of color mixture is less, resulting in an improvement in purity of the red color.

Furthermore, a dichroic mirror 207' has its property for reflection of light in a green region. As for a wavelength at which the reflectivity relative to the green-region light becomes 50% or less is generally set at about 505 nm plus/minus (±) 3 nm. Additionally, regarding the spectrum reflection characteristics of a trimming filter provided at a lens 210b', a wavelength whereat the reflectivity relative to the green-region light becomes 50% or less is typically set at about 560 nm.

Lastly, the remaining blue light flux is split by the characteristics of a dichroic mirror as provided at a mirror 209a', mirror 209b' or lens 208b', 210a'. At this time, a wavelength on the long-wavelength side whereat the reflectivity becomes 50% or less is typically set at about 485 nm±3 nm, whereas the short-wavelength side is such that a wavelength whereat the reflectivity of UV cur filter 220' becomes 50% or less is set at 428±3 nm in most cases.

The above is an explanation of the color separation unit in the illumination optical system. With the above-described technical means, the color light fluxes that are split into red, green and blue are guided to enter their respectively corresponding ones of the transmissive liquid crystal panels 212', 211' and 213', followed by modulation of the outgoing luminous flux amount (light amount) in conformity with the amplitude of an image signal and then synthesis by a dichroic prism 215', resulting in enlarged projection onto the screen by a projection lens 214'.

The projection type color display device stated above is faced with a problem as to brightness and color balance.

The light flux to be emitted from an ultrahigh pressure mercury lamp used as the light source of the color display device by way of example is such that the light flux in R (red) color wavelength region is less in luminous flux energy than light fluxes in B (blue) wavelength region and G (green) wavelength region.

In addition, for the illumination optical system of the color display device, an ultraviolet ray reflecting filter (not shown) or ultraviolet ray absorbing filter (not shown) is used in order to shield ultraviolet rays and/or light fluxes of the B (blue) wavelength region with relatively short wavelengths of 425 (nm) or below, which are emitted from the above-noted ultrahigh pressure mercury lamp. The reason of this is as follows. Upon receipt of energies owned by ultraviolet rays and relatively short wavelength light in the B (blue) color wavelength region over an extended period of time, the image display elements and optical components are damaged resulting in occurrence of operation failures.

Additionally, the projection lens has the following characteristics: its spectrum transmissivity is such that the transmissivity in the B (blue) color wavelength region becomes lower when compared to that of the G (green) color wavelength region and R (red) wavelength region. This occurs due to the presence of characteristics inherent to optical glass material, that is, the physical nature for absorption of short-wavelength light. Although this property differs depending on the kind of glass material, a glass material with large dispersion—this is inevitably required for reduction of on-axis chromatic aberration and magnification chromatic aberration—is greater in absorption of B (blue) wavelength region than glass material less in dispersion.

Furthermore, when choosing a liquid crystal panel as the image display element, it has the following property: the spectrum transmissivity characteristics of such liquid crystal panel are such that the transmissivity of B (blue) wavelength region is lower than the transmissivity of G (green) wavelength region and that of R (red) wavelength region.

In addition, in the illumination system of projection type color display device, one or more relay optical systems (relay lenses) are often employed in the B optical path. In this case, the B optical path becomes greater in number of lenses than R optical path and G optical path, by a degree corresponding to the relay lenses used. This would result in a likewise increase in loss of light flux amount by a degree corresponding to the number of these relay lenses through which light passes.

Consequently, in prior known projection type color display devices of brightness concern, color designs have been done in such a way that the color boundary line of white display is spaced apart from a black-body locus of isanomal shown in FIG. 10 toward the plus side (green-rich direction).

On the contrary, in projection type color display devices of white color line concern, in order to improve this color balance, an attempt has been made to provide an ND filter (not shown) which absorbs and attenuates light in the G (green) optical path in the illumination system optical path for improvement of the entire color balance.

As explained above, prior art color display devices suffer from a problem as to the lack of a capability to attain both the brightness and superior color balance at a time because of the shortage of red and blue light amounts with respect to green light amount.

Moreover, in the usage as television sets or as home theaters the market of which is expectable to noticeably expand in near future, a color temperature in the case of white color display is required to range from 6,500° K up to 9,300° K or more in the characteristic diagram of FIG. 9 showing a chromaticity chart and blackbody locus. Today, a set with its color temperature exceeding 15,000° K has already been available in the marketplace. Due to this, the attainability of both the brightness and the color temperature has been a great challenge or issue at the stage of product development.

Accordingly, an object of the present invention is to solve the problem stated above to thereby provide a projection type color display device capable of achieving superior color balance and high luminous flux amount (optical luminance) while retaining the color temperature at high levels during white color reproduction, and also realize a rear-projection type color display apparatus using this device.

To attain the foregoing object, a projection type color display device is provided, which comprises a white light source, light flux separating unit for separating a visible light flux emitted from the white light source into three primary colors of red, green and blue, an image display element with a matrix array of pixels having means for modulating the optical intensity of the light flux depending upon the amplitude of an image signal as input thereto, photosynthetic unit, and a projection lens device, wherein the optical intensity of a respective one of the three primary color light fluxes of red, green and blue as split by the light flux separating unit is modulated by an image display element provided in a way corresponding thereto and synthesized by the photosynthetic unit for projection in an enlarged form onto a screen by the projection lens device. During red image displaying, a red image signal is input to the red image display element while adding to a blue image signal a signal with its amplitude being 1/n times (n is a natural number) the amplitude of the red image signal and supplying it to the blue image display element.

Other objects, features and advantages of the invention will become apparent from the following description of the embodiments of the invention taken in conjunction with the accompanying drawings.

DETAILED DESCRIPTION OF THE EMBODIMENTS

Illustrative embodiments of the present invention will be explained with reference to the accompanying drawings below.

Figure 1:
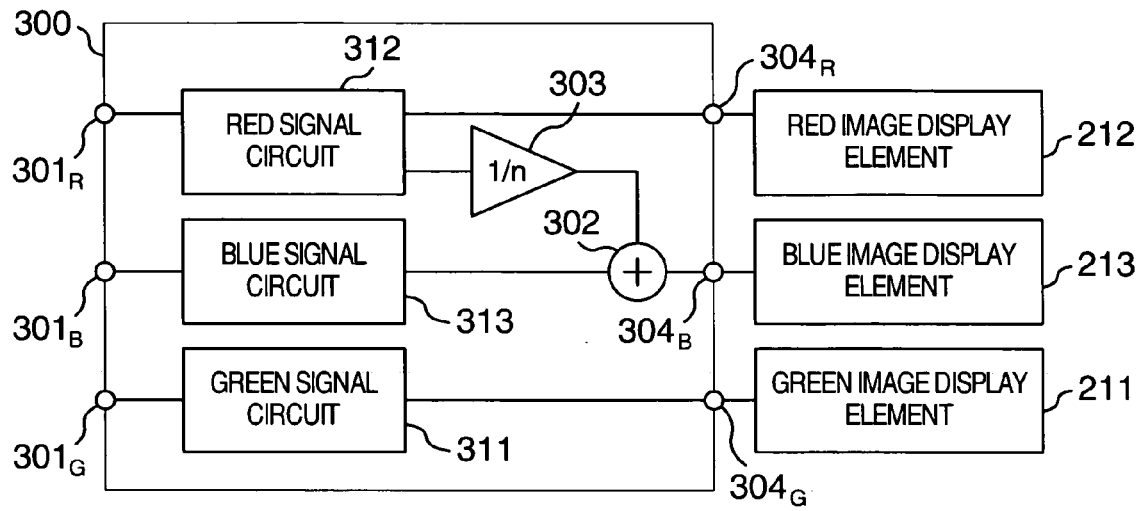
FIG. 1 is a block diagram of a signal processing circuit in accordance with one embodiment of the present invention as disclosed herein.

FIG. 1 is a schematic block diagram of a signal processing circuit in accordance with one embodiment of this invention. In FIG. 1, a red color signal which is input to an R input $301_R$ terminal of the signal processing circuit 300 is input through a red color signal circuit 312 to a red color image display element 212, whereas a green color signal that is input to G input $301_G$ terminal is input via a green color signal circuit 311 to a green image display element 211. On the other hand, a blue color signal as input to B input $301_B$ terminal is input via a blue signal circuit 313 to an adder circuit 302. In the adder circuit 302, an output of the red signal circuit 312 is 1/n-multiplied at an attenuating circuit 303 and then added to the blue signal, resulting in an added output being input to the blue image display element 213.

More specifically, in the color display device of this invention, at the time of displaying a red image, red image light which was modulated by the red image display element 212 and blue image light that was input as a 1/n-multiplied version of the red image signal and modulated by the blue image display element 213 are combined and synthesized together on a screen.

In addition, the use of the above-described circuit configuration makes it possible to adjust the chromaticity of an enlarged projection image on the screen, by inputting a red image signal to the red image display element 212 while at the same time varying the amplitude of the red image signal and inputting it to the blue image display element 213 during red image displaying. Note here that in FIG. 1, $304_R$, $304_G$ and $304_B$ are output terminals.

Figure 2:
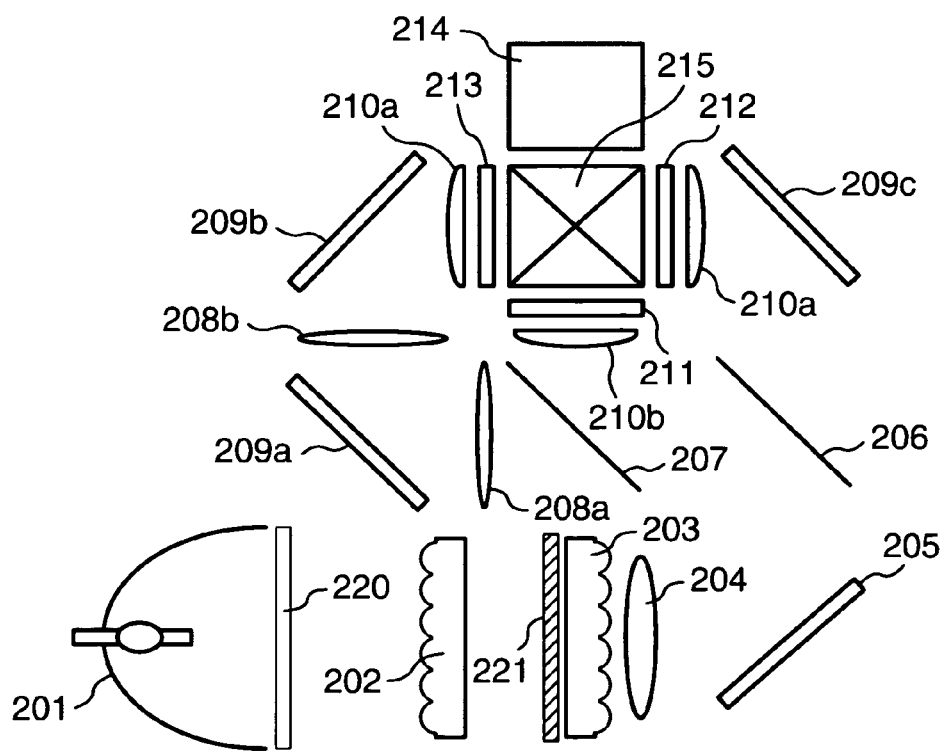
FIG. 2 is a diagram showing a configuration of a device using a transmissive liquid crystal panel as a color image device of the present invention.
Figure 3:
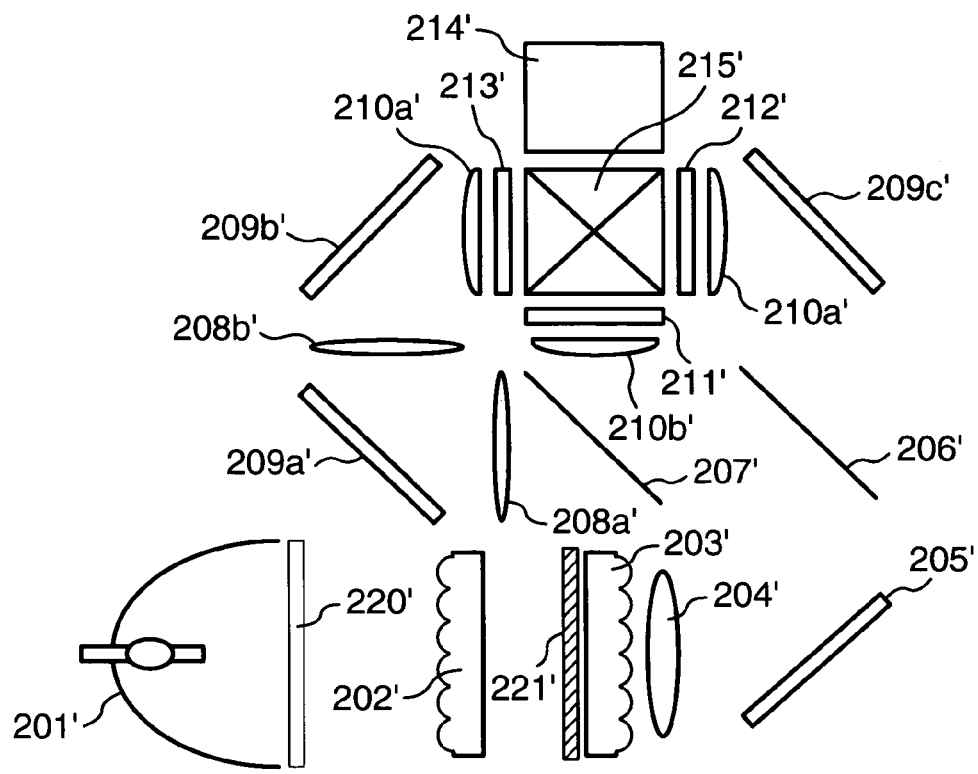
FIG. 3 is a configuration diagram of a projection type color display device using transmissive liquid crystal panels.

FIG. 2 shows one embodiment in the case of using transmissive liquid crystal panels as the image display elements in the color display device of the invention.

An explanation will first be given of a trimming method in the case of separating a white luminous flux into red, blue and green color light fluxes.

The chromaticity of red image light is determinable by the spectrum reflection characteristics of the dichroic mirror 206 and the spectrum reflection characteristics of a trimming filter provided at lens 210a. The wavelength at which the reflectivity of dichroic mirror 206 relative to red-region light becomes 50% or less is set at about 575 to 590 nm, for actively accommodating light components close to the orange color to thereby increase the light amount. In addition, the spectrum reflection characteristics of the trimming filter provided at the lens 210a are such that the wavelength whereat the reflectivity relative to the red-region light becomes 50% or less is set at about 585 nm. Obviously, the more sharp the fall-down property of the reflectivity at this time (reflectivity change/wavelength), the less the color mixture, resulting in an improvement in purity of the red color.

Furthermore, the dichroic mirror 207 has the property for reflecting the light of green region. The wavelength whereat the reflectivity relative to the green-region light becomes 50% or less is designed so that its short-wavelength side is set at about 510 to 525 nm for suppression of a blue-green color component; adversely, the long-wavelength side is arranged so that the spectrum reflection characteristics of the trimming filter provided at lens 210b are designed so that the wavelength whereat the reflectivity relative to the light of green region becomes 50% or less is set at about 570 to 590 nm for increasing yellow-green components to thereby adjust the light amount. A result of this is that although the value "x" of the chromaticity of green color components increases, blue-green components decrease and yellow components enter in place thereof when reproducing images of the flesh color, which is a mixture of red and green colors. Thus it becomes possible to reproduce the flesh color more naturally.

Lastly, the remaining blue luminous flux is optically split by the property of a dichroic mirror that is provided, for example, at a mirror 209a, mirror 209b or lens 208b, 210a. At this time, the wavelength on the long-wavelength side at which the reflectivity becomes 50% or less is set at 500 to 520 nm. On the other hand, the short-wavelength side is designed so that the wavelength whereat the reflectivity of a UV cut filter 220 becomes 50% or less is set at about 430 nm±3 nm, thereby enabling achievement of higher reliability than ever before.

In the present invention stated above, it is possible to realize superior color balance and high luminous flux amount (optical luminance) while retaining the color temperature at a higher level during white color reproduction, owing to the operability and effect as will be described below.

During blue color image reproduction, a blue image signal is added to an image display element corresponding to the blue color. Regarding a blue luminous flux at this time, the light amount is attainable by additionally accommodating light on longer wavelength side than the prior art. In contrast, during green image playback, a green image signal is added to an image display element corresponding to the green color. At this time, light of the region close to the blue color (short-wavelength side) which has been used in the prior art is no longer used; alternatively, light of the region near the yellow color (long-wavelength side) is used to adjust the balance of the light amount. During red image playback, a red image signal is added to an image display element corresponding to the red color while simultaneously performing 1/n-multiplication of the red signal for simultaneous addition to the blue image display element. At this time, a luminous flux falling onto the red image display element is such that not only the light flux of the near-red region (long-wavelength side) which has been used in the prior art but also a light flux of near-yellow region (short-wavelength side) is used to thereby increase the resultant light amount.

Figure 11:
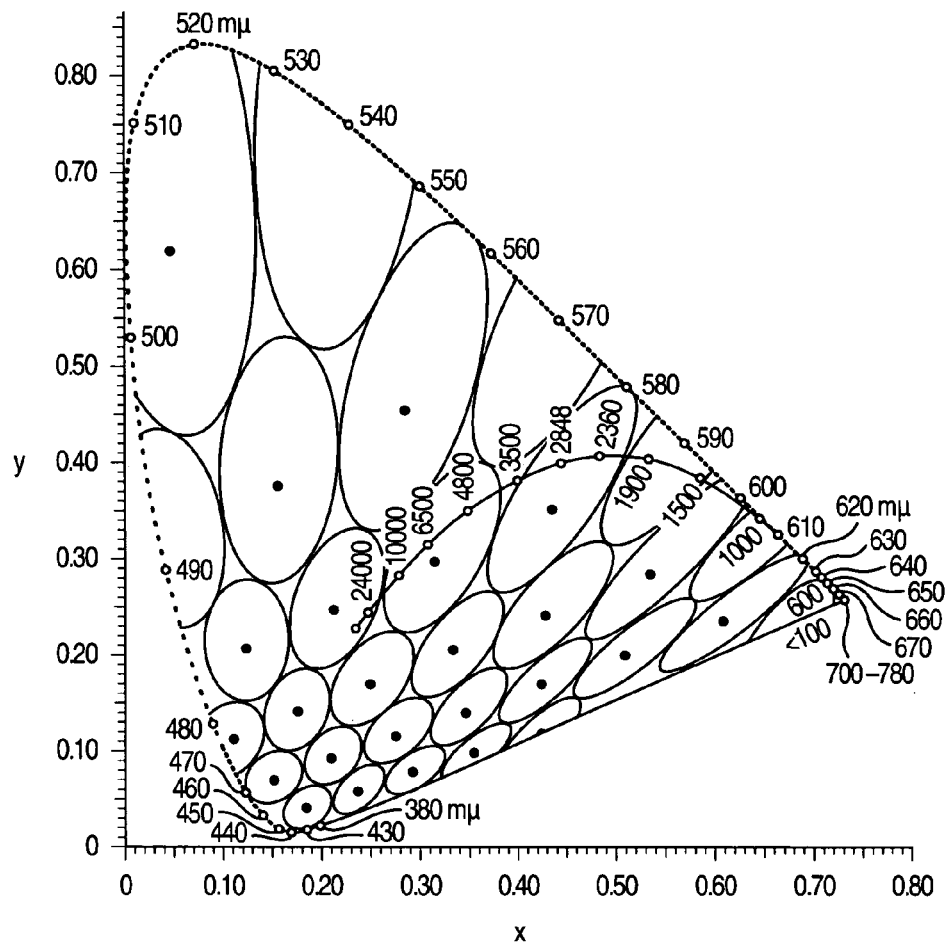
FIG. 11 is a diagram showing an identifiable zone on a standard chromaticity chart.

Although the additive accommodation of yellow color components into the red light flux for red image use results in establishment of the orange color that is high in value "y" of the chromaticity in the case of mere use of prior art configurations, the present invention is such that the red signal is subjected to 1/n multiplication and simultaneously added to the blue image display element whereby an image thus synthesized can decrease in value y of chromaticity due to the presence of blue components so that superior red light is obtainable. FIG. 11 shows an identifiable zone on a standard chromaticity chart, wherein a change of the value x of chromaticity is lower in sensitivity than a change of the value y component within a red light region with its wavelength being equal to or more than 590 nm. More specifically, the region that is identifiable as the same color exhibits a distorted elliptical shape along the "x" axis. Due to this, the change of the value x is less observable than the change of value y. Thus, owing to the above-stated resolving technique, it is felt that increased brightness and better chromaticity (deep red color) are obtained during red color reproduction.

In addition, for the white light obtained by mixture of three colors, the use of yellow components which could not been used in the prior art is permitted so that it is possible to achieve the conflicting issues—i.e., the color balance and higher luminous flux amount (optical luminance).

Figure 4:
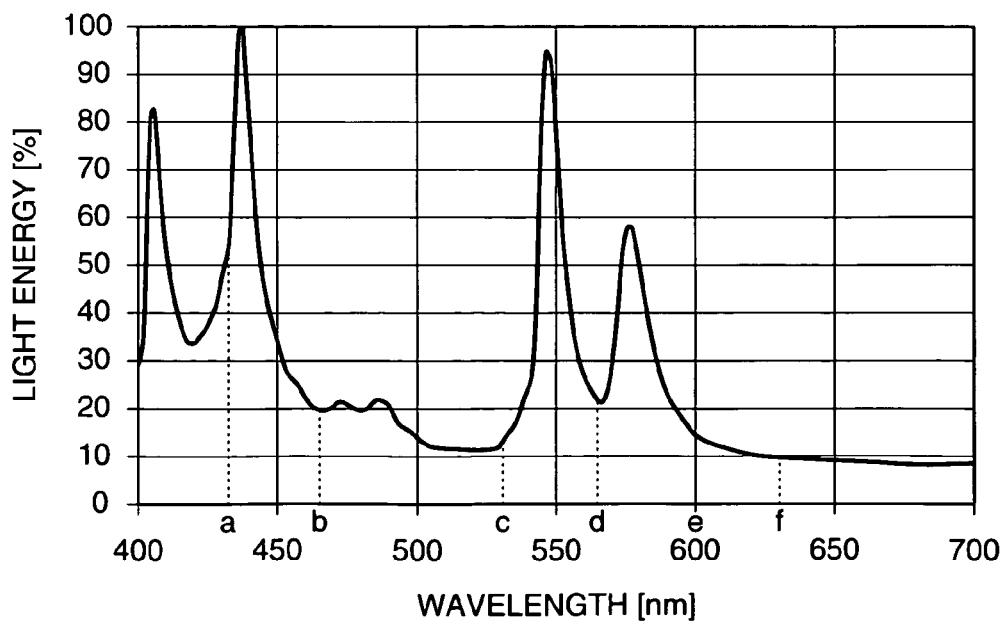
FIG. 4 is a characteristic diagram showing a spectrum energy distribution of a currently available ultra-high pressure mercury lamp.
Figure 5:
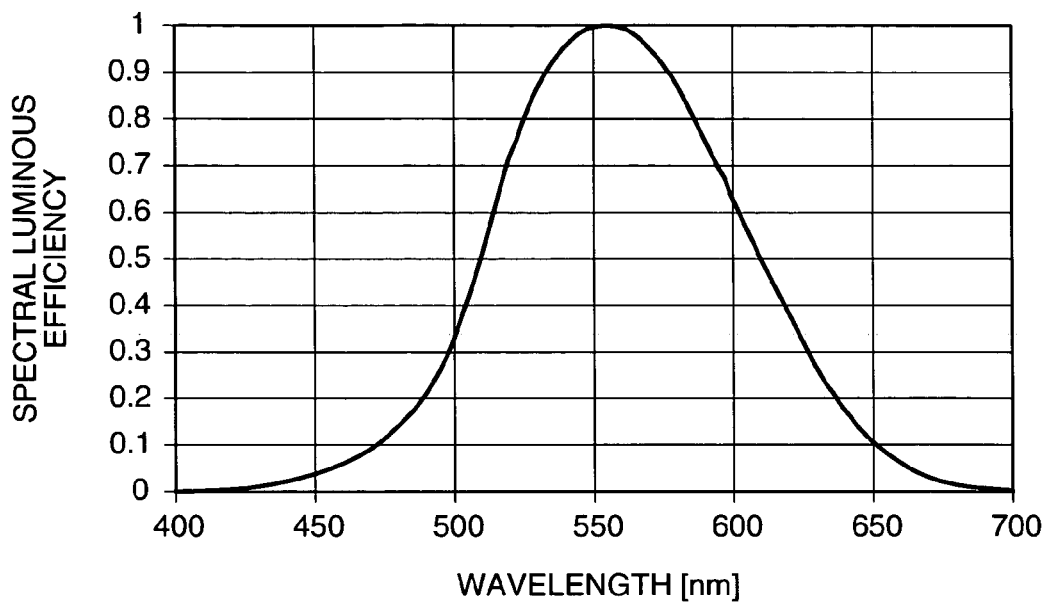
FIG. 5 is a characteristic diagram showing the spectral luminous efficacy properties of human eyes.

In FIG. 2, a white light flux emitted from a white light source 201 formed of an ultra-high pressure mercury lamp is split by the fly eye lens 202 into constituent colors, which are projected by the fly eye lens 203 and field lens 204 disposed at opposing positions in an enlarged form onto the liquid crystal panel (G) 211, liquid crystal panel (B) 213 and liquid crystal panel (R) 212 while being caused to overlap together. Thus, the energy distribution of the panel-incident light fluxes is made uniform. Additionally, as shown in FIG. 4, the spectrum energy of a light flux being emitted from the ultrahigh pressure mercury lamp is such that the energy of red light in a wavelength region of from a point "e" (600 nm) to point "f" (630 nm) is equal to or less than ⅓ of the energy of blue light in a wavelength regions spanning from a point "a" (435 nm) to point "b" (465 nm) and the energy of green light in a wavelength region ranging from a point "c" (535 nm) to point "d" (565 nm). Even when taking into consideration the spectral luminous efficiency characteristics shown in FIG. 5, the optical energy of the red region is relatively small.

Figure 8:
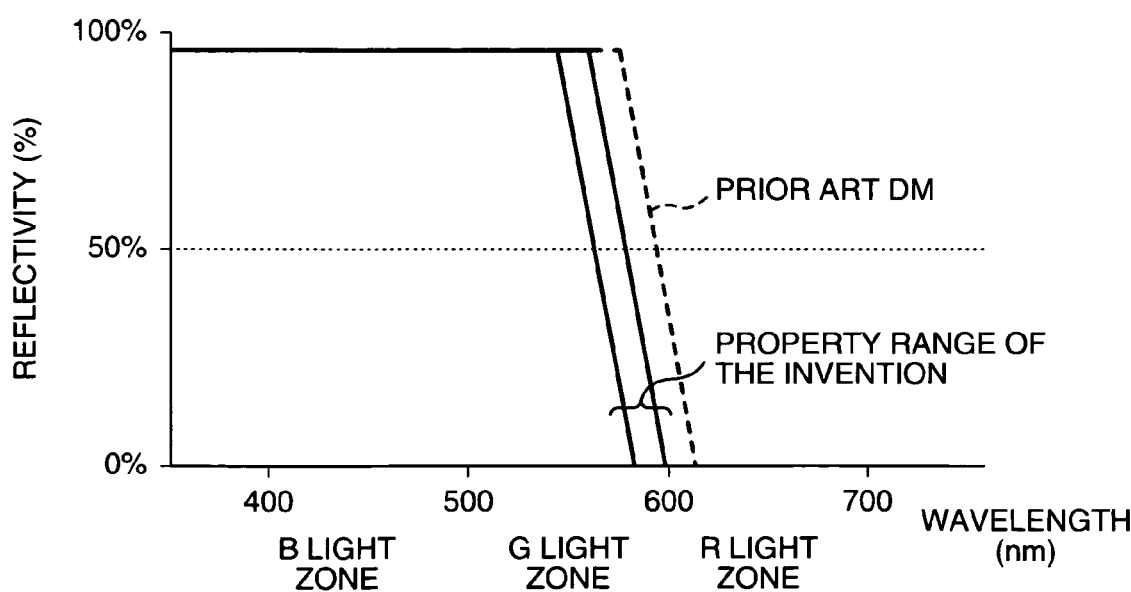
FIG. 8 is a characteristic diagram showing reflective film characteristics of a color separation optical system.
Figure 9:
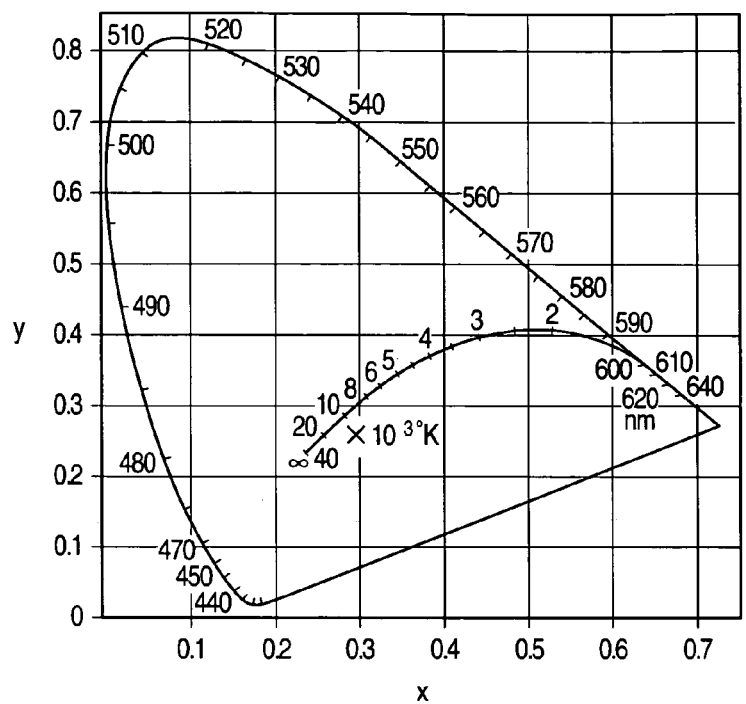
FIG. 9 is a "CIE 1964" chromaticity chart and a characteristic diagram showing a black-body locus.
Figure 10:
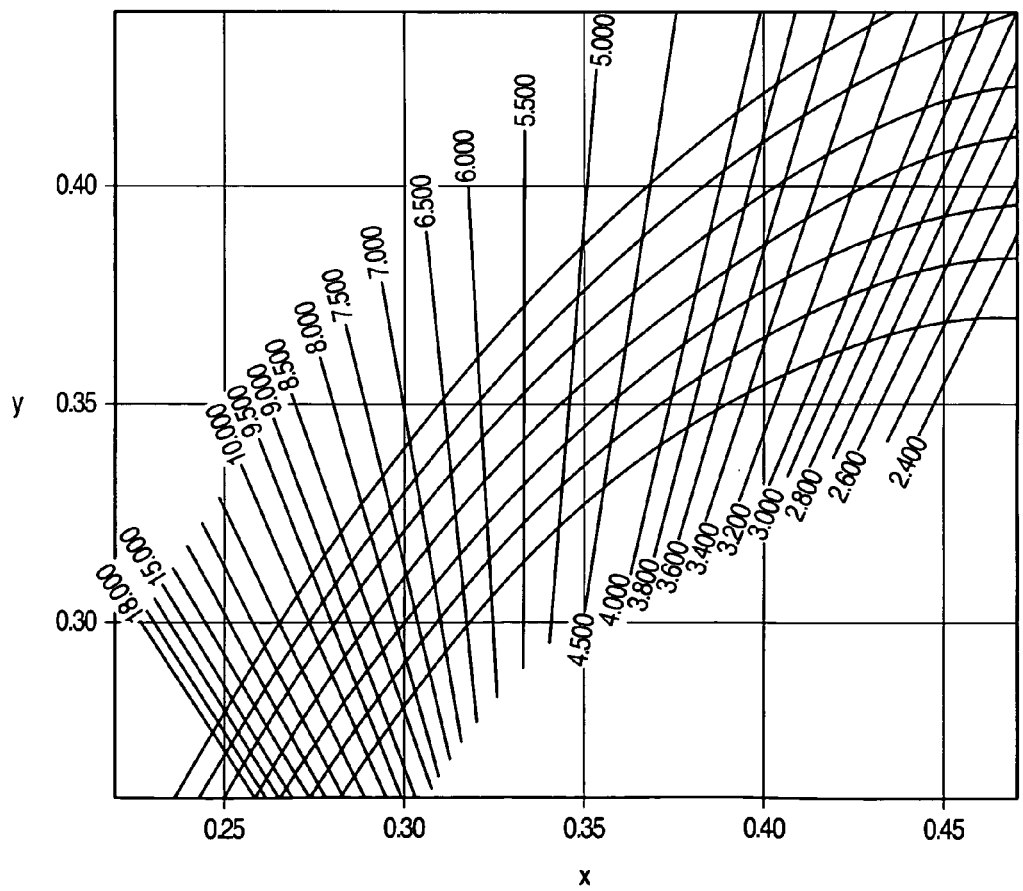
FIG. 10 is a characteristic diagram showing a blackbody locus.

The above-stated white light flux emitted from the white light source 201 is separated into a red light flux and a cyan light flux by the dichroic mirror 206 which is disposed in the optical path and has the spectrum reflectivity characteristics indicated by solid line in FIG. 8. In an embodiment of the present invention, the wavelength at which the reflectivity of the dichroic mirror 206 that determines the chromaticity of red color image light becomes 50% is set at 580 nm while setting at 587 nm the wavelength whereat the reflectivity of the trimming filter provided at the lens 210a becomes 50%.

Figure 7:
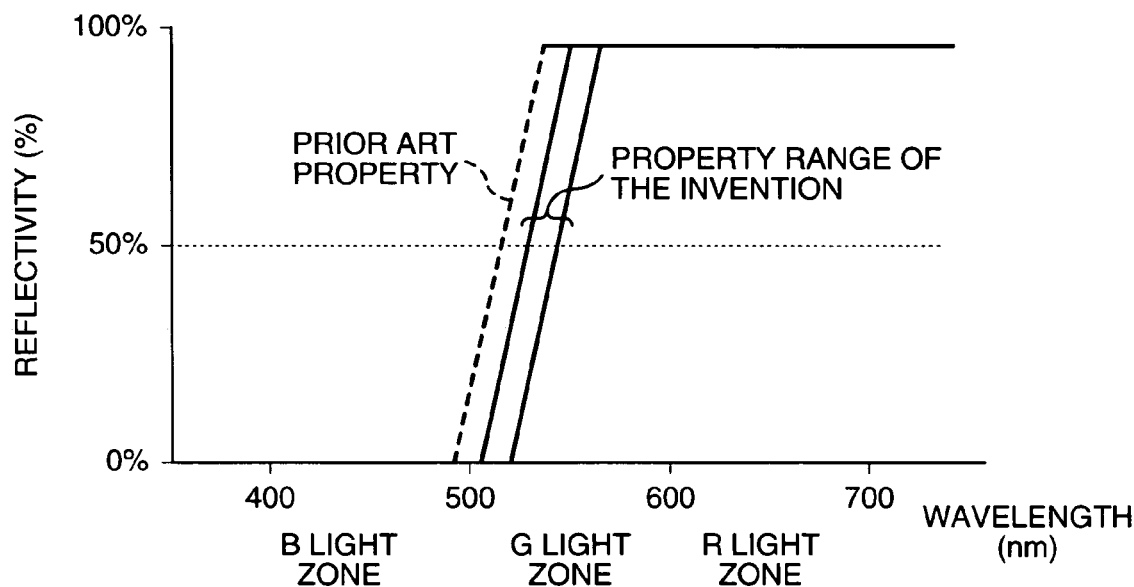
FIG. 7 is a characteristic diagram showing reflective film characteristics of a color separation optical system.

Furthermore, the dichroic mirror 207 having the reflection property shown by sold line in FIG. 7 is used for separation of light in the green region. An embodiment of this invention is such that the wavelength at which the reflectivity of the dichroic mirror 207 that determines the chromaticity of green image light becomes 50% is set at 515 nm, whereas the wavelength at which the reflectivity of the trimming filter provided at lens 210b becomes 50% is set at 568 nm.

Figure 6:
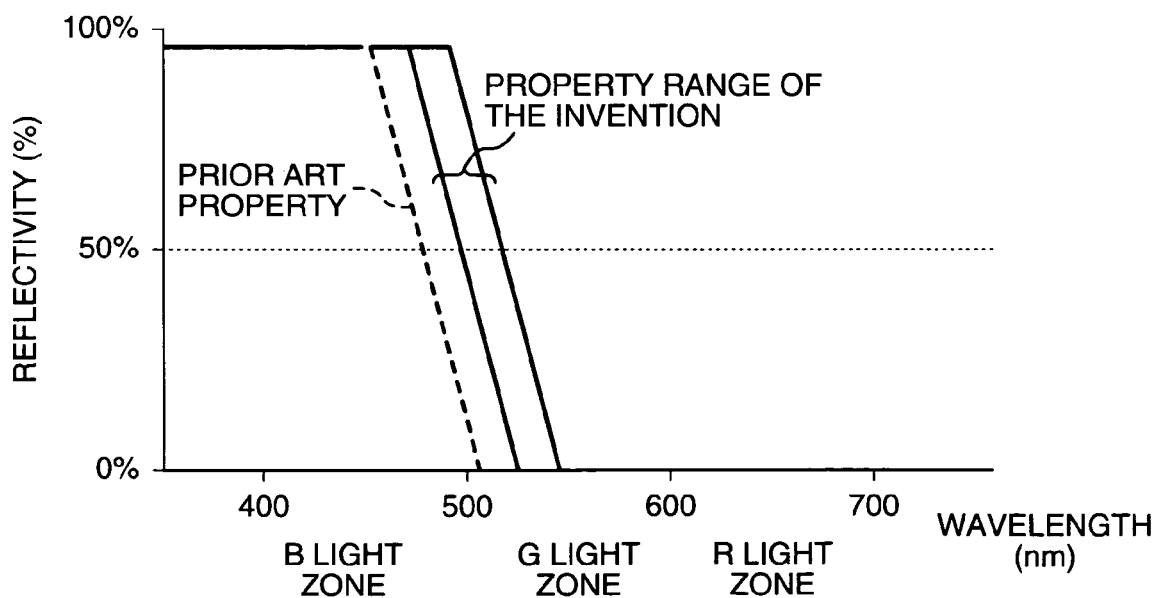
FIG. 6 is a characteristic diagram showing reflective film characteristics of a color separation optical system.

The last remaining blue light flux is done the spectrum by the dichroic mirror provided at the mirror 209a, mirror 209b, or lens 208b, 210a, which has the reflection property shown by solid line of FIG. 6. At this time, the wavelength on the long-wavelength side at which the reflectivity becomes 50% or less is set at 515 nm, while the short-wavelength side is such that the wavelength whereat the reflectivity of UV cut filter 220 becomes 50% or less is set at 431 nm.

Based on the foregoing conditions, in the above-stated illumination optical system using the ultrahigh pressure mercury lamp (arc length is 1.0 mm) having the spectrum light energy distribution shown in FIG. 4, signal circuitry with the configuration shown in FIG. 1 is prepared for inputting, at the time of red image displaying, a red image signal to the red image display panel while varying the amplitude of the red image signal and simultaneously inputting it to the blue image display panel (i.e., changing the color mixture ratio) to thereby modelize how an enlarged on-screen projection image changes in chromaticity and affirm it through simulation. Results are indicated in Tables 1 and table 2 below.

TABLE 1

Chromaticity change of red image light due to color mixture of blue image light (1).

| Color Blend Ratio | 0% | 1% | 2% | 3% | 4% | 5% |
|---|---|---|---|---|---|---|
| (NW) Value "x" | 0.266 | 0.266 | 0.266 | 0.266 | 0.266 | 0.266 |
| (NW) Value "y" | 0.263 | 0.263 | 0.263 | 0.263 | 0.263 | 0.263 |
| (R) Value x | 0.643 | 0.628 | 0.613 | 0.598 | 0.585 | 0.573 |
| (R) Value y | 0.356 | 0.347 | 0.339 | 0.331 | 0.323 | 0.316 |
| (G) Value x | 0.295 | 0.295 | 0.295 | 0.295 | 0.295 | 0.295 |
| (G) Value y | 0.693 | 0.693 | 0.693 | 0.693 | 0.693 | 0.693 |
| (B) Value x | 0.139 | 0.139 | 0.139 | 0.139 | 0.139 | 0.139 |
| (B) Value y | 0.070 | 0.070 | 0.070 | 0.070 | 0.070 | 0.070 |

TABLE 2

Chromaticity change of red image light due to color mixture of blue image light (2).

| Color Blend Ratio | 0% | 0.5% | 1.5% | 2.5% | 3.5% | 4.5% |
|---|---|---|---|---|---|---|
| (NW) Value "x" | 0.266 | 0.266 | 0.266 | 0.266 | 0.266 | 0.266 |
| (NW) Value "y" | 0.263 | 0.263 | 0.263 | 0.263 | 0.263 | 0.263 |
| (R) Value x | 0.643 | 0.635 | 0.620 | 0.605 | 0.592 | 0.579 |
| (R) Value y | 0.356 | 0.352 | 0.343 | 0.335 | 0.327 | 0.320 |
| (C) Value x | 0.295 | 0.295 | 0.295 | 0.295 | 0.295 | 0.295 |
| (C) Value y | 0.693 | 0.693 | 0.693 | 0.693 | 0.693 | 0.693 |
| (B) Value x | 0.139 | 0.139 | 0.139 | 0.139 | 0.139 | 0.139 |
| (B) Value y | 0.070 | 0.070 | 0.070 | 0.070 | 0.070 | 0.070 |

A chromaticity change of red image light due to mixture of blue image light is such that the ratio of the x axis to y axis of the chromaticity (identification ellipse near Rx=0.64) is about 3:1 as apparent from the identifiable zone in the standard chromaticity chart shown in FIG. 11. In other words, the change of Ry is three times greater in sensitivity than the change of Rx due to color mixture. On the other hand, as shown in Tables 1 and 2, the chromaticity of the red light that is obtainable by inputting, during red image light reproduction, a 1/n signal of the red image signal to the blue image element and then blending these two colors together on the screen is about two times as given by ΔRy=0.04 for ΔRx=0.08. Thus, the effect as to drop-down of the value y is significant so that superior chromaticity (deep red) is felt to be obtained. For the red image light, Rx is desirably greater than or equal to 0.60. This requires that the mixture ratio of blue image light be set to less than or equal to 3%-color mixture—preferably, at 2% or less. In the white light thus obtained by mixture of three colors at this time, it is possible to mix the blue light that was modulated by a red image signal into the red image light as stated previously. This enables the use of yellow color components, which have never been used in the prior art. Thus it is possible to achieve both the color balance and the high luminous flux amount (optical luminance) at a time. In the above-noted illumination optical system of this invention, the brightness was improved by 5% when compared to the prior art, as indicated in Table 3 below.

TABLE 3

| Performance Items | Prior Art | Embodiment |
|---|---|---|
| Brightness (lm) | 286 | 302 |
| (NW) Value x | 0.259 | 0.266 |
| (NW) Value y | 0.257 | 0.263 |
| (R) Value x | 0.655 | 0.643 |
| (R) Value y | 0.345 | 0.356 |

TABLE 3-continued

| Performance Items | Prior Art | Embodiment |
|---|---|---|
| (G) Value x | 0.293 | 0.295 |
| (G) Value y | 0.694 | 0.693 |
| (B) Value x | 0.140 | 0.139 |
| (B) Value y | 0.063 | 0.070 |

On the contrary, in the embodiment of this invention, it is possible to mix into red image light the blue light that was modulated by a red image signal. Thus, there is also an effect unique to the invention which follows: the red image light obtained on the screen can be kept almost constant even when the dichroic mirror 206 affecting the chromaticity of red image light and the trimming filter provided at the lens 210a vary or fluctuate in spectrum reflection characteristics.

The above is an explanation of the color separator unit in the illumination optical system. The color luminous fluxes of red, green and blue as split by the above-described technical means are guided to fall onto their corresponding transmissive liquid crystal panels 212, 211 and 213 respectively and then subjected to modulation of outgoing light flux amounts (light amounts) in conformity with the amplitude of an image signal and next synthesized together by a dichroic prism 215 for enlarged projection onto the screen by a projection lens 214.

Figure 12:
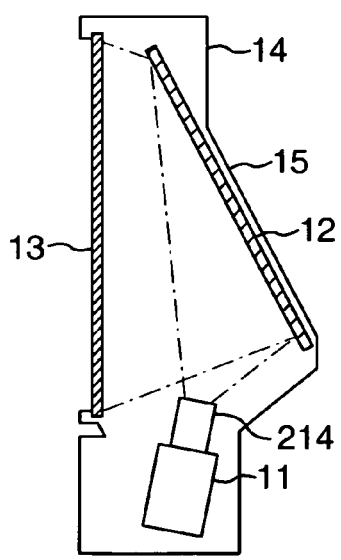
FIG. 12 is a vertical-direction cross-sectional diagram showing main part of a rear-projection type image display apparatus with the projection optical system of this invention being built therein.
Figure 13:
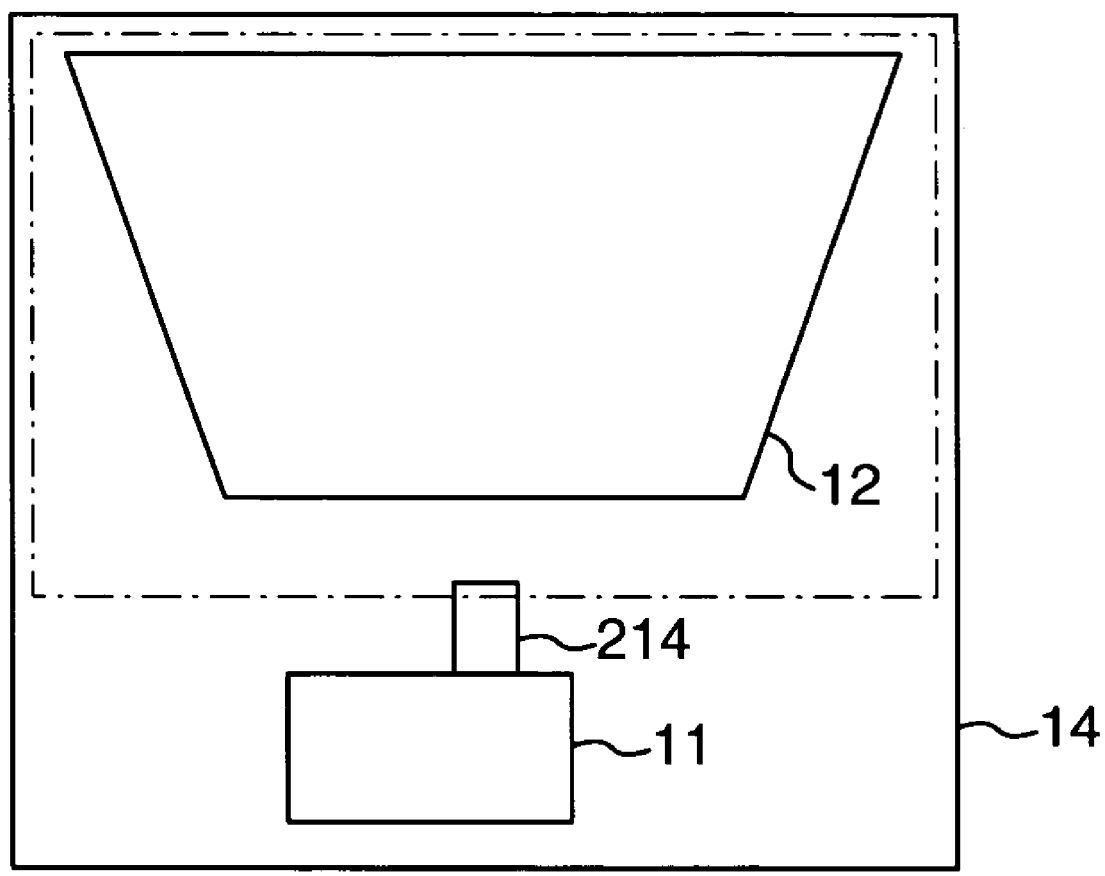
FIG. 13 is a front view of the projection image display apparatus in accordance with one embodiment of the invention.

Next, FIG. 12 is a vertical-direction cross-sectional diagram showing main part of a rear-projection image display apparatus which involves therein the projection type color display device of this invention. FIG. 13 a front view of the display apparatus. In FIG. 12, the apparatus is arranged to use a projection lens 214 to project an image obtainable at a color display device 11 in an enlarged form onto a screen 13 via a turn-back or fold mirror 12. Numeral 14 denotes a cabinet (housing), and 15 is a back cover. This embodiment is arranged so that the optical axis of the projection lens 214 is substantially identical to the center of an outer shape of the screen 13. The reflection losses occurring due to a Fresnel lens at the periphery of a viewing screen becomes uniform at four corners.

According to the present invention, in the white color light obtained by mixture of three colors on the screen, it becomes possible to achieve both color balance improvement and higher luminous flux amount (high luminance) at a time.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A projection type color display device comprising:
a white light source;
a light flux separating unit which separates a visible light flux emitted from the white light source into three primary colors of red, green and blue;
image display elements corresponding to respective colors of light fluxes as split by said light flux separating unit, each said element including a matrix array of pixels and having unit which modulates optical intensity of the light flux depending on an amplitude of an image signal as input thereto;
a photosynthetic unit for combining together the light fluxes of respective colors subjected to optical intensity modulation by said image display elements; and
a projection lens for projecting image light thus combined by said photosynthetic unit in an enlarged form onto a screen, wherein
during red image displaying, an image display element corresponding to red color is modulated by a red image signal while adding to a blue image signal a signal having an amplitude which is no greater than 3% of an amplitude of said red image signal to thereby modulate by the added signal an image display element corresponding to blue color.

2. The projection type color display device according to claim 1, wherein said white light source is arranged so that a light energy of red light region is less than a light energy of remaining color light regions.

3. The projection type color display device according to claim 2, wherein said white light source includes any one of an ultra-high pressure mercury lamp, a xenon lamp and a metal halide lamp.

4. The projection type color display device according to claim 1, wherein said white light source includes any one of an ultrahigh pressure mercury lamp, a xenon lamp and a metal halide lamp.

5. The projection type color display device according to claim 1, wherein when average energy intensities of the light fluxes of the three primary colors of red, green and blue as split by said light flux separating unit are given as EB, EG and ER, the following relationships are satisfied:

$$EG>3 \cdot ER$$

$$EB>3 \cdot ER$$

where, EG is an average energy of 535 (nm) to 565 (nm) of the white light source, ER is an average energy of 600 (nm) to 630 (nm) of the white light source, and EB is an average energy of 435 (nm) to 465 (nm) of the white light source.

6. The projection type color display device according to claim 2, wherein when average energy intensities of the light fluxes of the three primary colors of red, green and blue as split by said light flux separating unit are given as EB, EG and ER, the following relationships are satisfied:
ti $EG>3 \cdot ER$ $$EB>3 \cdot ER$$

where, EG is an average energy of 535 (nm) to 565 (nm) of the white light source, ER is an average energy of 600 (nm) to 630 (nm) of the white light source, and EB is an average energy of 435 (nm) to 465 (nm) of the white light source.

7. The projection type color display device according to claim 3, wherein when average energy intensities of the light fluxes of the three primary colors of red, green and blue as split by said light flux separating unit are given as EB, EG and ER, the following relationships are satisfied:

$$EG>3 \cdot ER$$

$$EB>3 \cdot ER$$

where, EG is an average energy of 535 (nm) to 565 (nm) of the white light source, ER is an average energy of 600 (nm) to 630 (nm) of the white light source, and EB is an average energy of 435 (nm) to 465 (nm) of the white light source.

8. The projection type color display device according to claim 4, wherein when average energy intensities of the light fluxes of the three primary colors of red, green and blue as split by said light flux separating unit are given as EB, EG and ER, the following relationships are satisfied:

$EG > 3 \cdot ER$ $EB > 3 \cdot ER$ where, EG is an average energy of 535 (nm) to 565 (nm) of the white light source, ER is an average energy of 600 (nm) to 630 (nm) of the white light source, and EB is an average energy of 435 (nm) to 465 (nm) of the white light source.

9. A projection type color display device comprising:
a white light source;
a light flux separating unit which separates a visible light flux emitted from the white light source into three primary colors of red, green and blue;
image display elements corresponding to respective colors of light fluxes as split by said light flux separating unit, each said element including a matrix array of pixels and having unit which modulates optical intensity of the light flux depending on an amplitude of an image signal as input thereto;
a photosynthetic unit for combining together the light fluxes of respective colors subjected to optical intensity modulation by said image display elements;
a projection lens for projecting image light thus combined by said photosynthetic unit; and
an optical-path fold mirror for folding projected light from said projection lens and for projecting the light in an enlarged form onto a screen, wherein
during red image displaying, an image display element corresponding to red color is modulated by a red image signal while adding to a blue image signal a signal having an amplitude which is no greater than 3% of said red image signal to thereby modulate by the added signal an image display element corresponding to blue color.

10. The projection type color display device according to claim 9, wherein said white light source is arranged so that a light energy of red light region is less than a light energy of remaining color light regions.

11. The projection type color display device according to claim 9, wherein said white light source includes any one of an ultrahigh pressure mercury lamp, a xenon lamp and a metal halide lamp.

12. The projection type color display device according to claim 9, wherein when average energy intensities of the light fluxes of the three primary colors of red, green and blue as split by said light flux separating unit are given by EB, EG and ER, the following relationships are satisfied:

$EG > 3 \cdot ER$ $EB > 3 \cdot ER$ where, EG is an average energy of 535 (nm) to 565 (nm) of the white light source, ER is an average energy of 600 (nm) to 630 (nm) of the white light source, and EB is an average energy of 435 (nm) to 465 (nm) of the white light source.

13. A projection type color display device comprising:
a white light source;
a light flux separating unit which separates a visible light flux emitted from the white light source into three primary colors of red, green and blue;
image display elements corresponding to respective colors of light fluxes as split by said light flux separating unit, each said element including a matrix array of pixels and having unit which modulates optical intensity of the light flux depending on an amplitude of an image signal as input thereto;
a photosynthetic unit for combining together the light fluxes of respective colors subjected to optical intensity modulation by said image display elements; and
a projection lens for projecting image light thus combined by said photosynthetic unit in an enlarged form onto a screen;
wherein when average energy intensities of the light fluxes of the three primary colors of red, green and blue as split by said light flux separating unit are given as EB, EG and ER, the following relationships are satisfied:

$EG > 3 \cdot ER$ $EB > 3 \cdot ER$ where, EG is an average energy of 535 (nm) to 565 (nm) of the white light source, ER is an average energy of 600 (nm) to 630 (nm) of the white light source, and EB is an average energy of 435 (nm) to 465 (nm) of the white light source; and
wherein during red image displaying, an image display element corresponding to red color is modulated by a red image signal, wherein said device has control unit for controlling an amplitude of said red image signal, and wherein the red image signal as amplitude-controlled by said control unit is added to a blue image signal for driving said image display element corresponding to the blue color based on the added signal to thereby adjust chromaticity of an enlarged projection image on said screen.

* * * * *